United States Patent
Okamoto (10) Patent No.: US 8,803,462 B2
(45) Date of Patent: Aug. 12, 2014

(54) MOTOR DRIVE UNIT (75) Inventor: Isao Okamoto, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 168 days.

(21) Appl. No.: 13/580,585

(22) PCT Filed: Feb. 24, 2011

(86) PCT No.: PCT/JP2011/054086
§ 371 (c)(1),
(2), (4) Date: Aug. 22, 2012

(87) PCT Pub. No.: WO2011/105468
PCT Pub. Date: Sep. 1, 2011

(65) Prior Publication Data
US 2012/0313561 A1  Dec. 13, 2012

(30) Foreign Application Priority Data
Feb. 24, 2010  (JP) .................................. 2010-038779

(51) Int. Cl.
*H02P 29/02* (2006.01)
(52) U.S. Cl.
USPC ............................ 318/459; 318/245; 388/903
(58) Field of Classification Search
CPC ....... H02P 6/002; H02P 29/02; H02P 29/022; H02P 29/028; H02P 27/08; H02P 29/021; H02P 29/024; H02P 29/025; H02P 29/027; H02P 5/685; H02P 8/36; H02P 9/006
USPC ................. 318/139, 244, 245, 459, 478, 479; 388/903, 909
See application file for complete search history.

(56) References Cited

U.S. PATENT DOCUMENTS 4,691,149 A * 9/1987 Baumgartner et al. ....... 388/809
6,785,106 B2 * 8/2004 Nagata ............................ 361/86

* cited by examiner

*Primary Examiner* — Bentsu Ro
(74) *Attorney, Agent, or Firm* — Buchanan Ingersoll & Rooney PC

(57) ABSTRACT

A switching element is switched off after having been switched on for only a short time interval called a first predetermined time interval, and a determination is made, based on a mode of a change in a contact point potential (a regeneration voltage) between an electric motor and the switching element when the switching element as switched off, as to whether or not one of the electric motor and the switching element has failed. Next, the switching element is switched on for a time interval called a second predetermined time interval, which is longer than the first predetermined time interval, and a determination is made, based on the magnitude of the contact point potential at that time, as to which one of the electric motor and the switching element has failed. It is thus possible for a failure of the switching element and electric motor to be detected.

18 Claims, 4 Drawing Sheets

MOTOR DRIVE UNIT

TECHNICAL FIELD

The present invention relates to a motor drive device that supplies electricity to an electric motor by operating a switching element.

BACKGROUND ART

A motor failure determination device has been disclosed in PTL 1 that can determine that a failure has occurred in an electric motor while performing motor drive that supplies electricity to the electric motor from a direct current power supply based on on and off operations of a switching element. The motor failure determination device monitors the electric potential at a contact point between the electric motor and the switching element and determines that the electric motor has failed based on a back electromotive force that arises in the motor when the supply of electricity to the electric motor is switched from on to off. Specifically, in a case where the shaft of the electric motor is locked, the electric motor does not turn, so the value of the back electromotive force that arises when the supply of electricity to the electric motor is switched from on to off is different from the value when the motor is in a normal state. The locking of the electric motor shaft is detected based on the value of the back electromotive force.

CITATION LIST

Patent Literature

[PTL 1]
Japanese Patent Application Publication No. JP-A-2935335

SUMMARY OF INVENTION

Technical Problem

However, failures in the circuit that performs the motor drive occur in a variety of the modes, and switching element failures and the like occur that are other than the locking of the electric motor shaft. For example, in a case where the switching element has failed, the voltage drop in the switching element is greater than normal, and the voltage that is applied to the electric motor drops. In this sort of case, the desired motor characteristics cannot be obtained. The motor failure determination device that is described in PTL 1 cannot detect the various types of failures other than the locking of the electric motor shaft, so it would be desirable for the device to be made able to detect the switching element failures that are other than the locking of the electric motor shaft.

In light of the foregoing, it is an object of the present invention to provide a motor drive device that is able to detect switching element failures in addition to the failure of the electric motor.

Solution to Problem

In order to achieve the above-described object, the invention that is described in first aspect is characterized by including a first contact point potential acquisition means that acquires a contact point potential between an electric motor (2) and a switching element (4) when the switching element (4) is switched from on to off and the contact point potential changes in conjunction with a termination of a supply of electric power to the electric motor (2); a second contact point potential acquisition means that acquires the contact point potential while the electric power is being supplied to the electric motor (2) when the switching element (4) has been switched on; a first determination means that determines, based on the contact point potential that has been acquired by the first contact point potential acquisition means, whether a mode of change in the contact point potential that is associated with the termination of the supply of the electric power to the electric motor (2) is a mode when the electric motor (2) and the switching element (4) are normal or a mode when one of the electric motor (2) and the switching element (4) has failed; a second determination means that determines whether the contact point potential that has been acquired by the second contact point potential acquisition means is equal to or larger than a predetermined first threshold potential (Vth1); and a failure diagnosis means that determines that the electric motor (2) and the switching element (4) are normal if it is determined by the first determination means that the mode of the change in the contact point potential is the mode when the electric motor (2) and the switching element (4) are normal, determines that the electric motor (2) has failed if it is determined by the first determination means that the mode of the change in the contact point potential is the mode when one of the electric motor (2) and the switching element (4) has failed and if it is also determined by the second determination means that the contact point potential is equal to or larger than the predetermined first threshold potential (Vth1), and determines that the switching element (4) has failed if it is determined by the first determination means that the mode of the change in the contact point potential is the mode when one of the electric motor (2) and the switching element (4) has failed and if it is also determined by the second determination means that the contact point potential is less than the predetermined first threshold potential (Vth1).

The determination as to whether the electric motor (2) and the switching element (4) are normal or one of them has failed can thus be made based on the contact point potential while the electric power is being supplied to the electric motor (2) and the contact point potential that changes in conjunction with the termination of the supply of the electric power to the electric motor (2). Moreover, in a case where one of the electric motor (2) and the switching element (4) has failed, it is possible to specify which one has failed. This makes it possible to make the motor drive device capable of detecting a failure of the switching element (4) in addition to a failure of the electric motor (2).

The invention that is described in second aspect is characterized in that the second contact point potential acquisition means acquires the contact point potential after a duration of an inrush current has elapsed after supplying of the electric power to the electric motor (2) is performed.

Acquiring the contact point potential in this manner after the time period has elapsed during which the inrush current is generated makes it possible to acquire the contact point potential while the electric power is being supplied to the electric motor (2) after the electric motor (2) has transitioned to a steady state, which in turn makes it possible to perform the failure determination accurately.

Here, it is desirable from the standpoint of reducing the operating noise of the electric motor (2) to shorten the time interval during which the electric motor (2) is driven by making a first predetermined time interval (T1) and a second predetermined time interval (T2) shorter.

On the other hand, it is desirable from the standpoint of improving the accuracy of the failure determination to make the second predetermined time interval (T2) longer than the time period during which the inrush current is generated when the switching element (4) is switched on, such that the contact point potential is acquired after the time period has elapsed during which the inrush current is generated, as described above. In that case, the second predetermined time interval (T2) cannot be made as short as the first predetermined time interval (T1).

Accordingly, the invention that is described in third aspect is characterized in that a first electric power supply control means performs supplying of electric power to the electric motor (2) by turning the switching element (4) on for a first predetermined time interval (T1); a second electric power supply control means performs supplying of electric power to the electric motor (2) by turning the switching element (4) on for a second predetermined time interval (T2), which is longer than a duration of an inrush current that is generated when the switching element (4) is switched on; the first contact point potential acquisition means acquires the contact point potential that changes in conjunction with the termination of the supply of the electric power to the electric motor (2) by the first electric power supply control means; the second contact point potential acquisition means acquires the contact point potential after the duration of the inrush current has elapsed after the supplying of the electric power to the electric motor (2) is started by the second electric power supply control means; and supplying of the electric power by the first electric power supply control means and acquiring of the contact point potential by the first contact point potential acquisition means are performed before supplying of the electric power by the second electric power supply control means and acquiring of the contact point potential by the second contact point potential acquisition means are performed.

Because the acquiring of the contact point potential by the first contact point potential acquisition means is performed before the supplying of the electric power by the second electric power supply control means and the acquiring of the contact point potential by the second contact point potential acquisition means are performed, the determination as to whether the electric motor (2) and the switching element (4) are normal or one of them has failed can be made just by operating the electric motor (2) for only the first predetermined time interval (T1), which is shorter than the second predetermined time interval (T2). In other words, it is possible both to improve the accuracy of the failure determination and to reduce the operating noise of the electric motor (2).

In that case, as described in fourth aspect, the time interval during which the electric motor (2) is driven when the electric motor (2) and the switching element (4) are normal can be shortened if the supplying of the electric power by the second electric power supply control means and the acquiring of the contact point potential by the second contact point potential acquisition means are performed only when it has been determined by the first determination means that the mode of the change in the contact point potential is the mode when one of the electric motor (2) and the switching element (4) has failed, and are not performed when it has been determined by the first determination means that the mode of the change in the contact point potential is the mode when the electric motor (2) and the switching element (4) are normal. Therefore, in a case where the electric motor (2) and the switching element (4) are normal, shortening the time interval during which the electric motor (2) is driven makes it possible to complete the failure determination without letting the operating noise and vibration of the electric motor (2) be generated for a long time interval, and without diminishing the attractiveness of the electric motor (2) as a product.

The invention that is described in fifth aspect is characterized in that the supplying of the electric power by the first electric power supply control means and the acquiring of the contact point potential by the first contact point potential acquisition means are performed a plurality of times before the supplying of the electric power by the second electric power supply control means and the acquiring of the contact point potential by the second contact point potential acquisition means are performed.

The supplying of the electric power by the first electric power supply control means and the acquiring of the contact point potential by the first contact point potential acquisition means are thus performed a plurality of times. To the extent that the number of times that the supplying of the electric power and the acquiring of the contact point potential are performed increases, the determination as to whether one of the electric motor (2) and the switching element (4) has failed can be made more accurately.

The invention that is described in sixth aspect is characterized in that in the plurality of times of the supplying of the electric power by the first electric power supply control means and the acquiring of the contact point potential by the first contact point potential acquisition means, the first predetermined time interval at one of the plurality of times is made shorter as the one of the plurality of times occurs earlier; and the supplying of the electric power is performed again by the first electric power supply control means only when it has been determined by the first determination means, based on the contact point potential that was previously acquired by the first contact point potential acquisition means, that the mode of the change in the contact point potential is the mode when one of the electric motor (2) and the switching element (4) has failed, and the supplying of the electric power is not performed again when it has been determined, based on the previously acquired contact point potential, that the mode of the change in the contact point potential is the mode when the electric motor (2) and the switching element (4) are normal.

The first predetermined time interval (T1), during which the electric power is supplied, is thus made shorter each time the supplying of the electric power is performed than it will be the next time, and if, during the preceding time that the electric power was supplied, it was determined that neither one of the electric motor (2) and the switching element (4) has failed, the processing will not be performed thereafter, so the time interval during which the electric motor (2) is driven can be shortened. Thus the time interval during which the operating noise and vibration of the electric motor (2) are generated can be shortened, even as the accuracy of the failure determination is improved.

For example, as described in seventh aspect, the first determination means determines whether the contact point potential that has been acquired by the first contact point potential acquisition means is equal to or smaller than a predetermined second threshold potential (Vth2) and defines, as a measurement time interval (T), a time interval from a time point when the supplying of the electric power to the electric motor (2) is terminated to a time point when it is determined that the contact point potential is equal to or smaller than the second threshold potential (Vth2), and determining, in a case where the measurement time interval (T) is equal to or larger than a predetermined threshold time interval (Tth), that the mode of the change in the contact point potential is the mode when the electric motor (2) and the switching element (4) are normal, and determining, in a case where the measurement time interval (T) is less than the threshold time interval (Tth), that the mode of the change in the contact point potential is the mode when one of the electric motor (2) and the switching element (4) has failed.

In that case, as described in eighth aspect, where the electric motor (2) is used for driving an electric pump that increases brake fluid pressure in a brake system of a vehicle, providing a brake operation amount detection means that detects an amount of operation of a brake operating member (5) for operating the brake system, as well as a brake operation amount versus threshold time interval setting means that makes the threshold time interval (Tth) shorter as the operation amount that has been detected by the brake operation amount detection means becomes greater, makes it possible for the threshold time interval (Tth) to be set in accordance with the load that bears on the electric motor (2).

Specifically, during the operation of the brake, the load that bears on the electric motor (2) increases, because the brake fluid pressure bears on the electric pump, based on the brake operation. Therefore, varying the threshold time interval (Tth) based on the amount of operation of the brake operating member (5) makes it possible to set the threshold time interval (Tth) in accordance with the load that bears on the electric motor (2), so that the failure determination can be performed accurately, even if there is a change in the mode of the change in the contact point potential according to the load that bears on the electric motor (2) at the time that the supply of the electric power is stopped.

Furthermore, as described in ninth aspect, providing a power supply voltage detection means that detects a voltage of the direct current power supply (3), as well as a power supply voltage versus threshold time interval setting means that makes the threshold time interval (Tth) shorter as the direct current power supply (3) voltage that has been detected by the power supply voltage detection means becomes smaller, makes it possible for the threshold time interval (Tth) to be set in accordance with the voltage that is applied to the electric motor (2).

Specifically, the voltage level of the direct current power supply (3) sometimes varies, and in that case, the voltage that is applied to the electric motor (2) when the switching element (4) is switched on also varies. Therefore, varying the threshold time interval (Tth) in accordance with the voltage of the direct current power supply (3) makes it possible for the failure determination to be performed accurately, even if there is a change in the mode of the change in a motor supply voltage according to the voltage that is supplied to the electric motor (2) at the time that the supply of the electric power is stopped.

Furthermore, as described in tenth aspect, the first contact point potential acquisition means acquires the contact point potential at a time point when a predetermined set time interval ($T_{SET}$) has elapsed since a time point when supply of the electric power to the electric motor (2) is terminated, and the first determination means determines that the mode of the change in the contact point potential is the mode when the electric motor (2) and the switching element (4) are normal in a case where the contact point potential that has been acquired by the first contact point potential acquisition means is equal to or larger than a predetermined set potential ($V_{SET}$), and determines that the mode of the change in the contact point potential is the mode when one of the electric motor (2) and the switching element (4) has failed in a case where the contact point potential that has been acquired by the first contact point potential acquisition means is less than the predetermined set potential ($V_{SET}$).

In that case, too, as described in eleventh aspect, where the electric motor (2) is used for driving an electric pump that increases brake fluid pressure in a brake system of a vehicle, providing a brake operation amount detection means that detects an amount of operation of a brake operating member (5) for operating the brake system, as well as a brake operation amount versus potential setting means that makes the set potential ($V_{SET}$) smaller as the operation amount that has been detected by the brake operation amount detection means becomes greater, makes it possible for the set potential ($V_{SET}$) to be set in accordance with the load that bears on the electric motor (2). The same sort of effect can thus be achieved as was achieved by eighth aspect.

Furthermore, as described in twelfth aspect, providing a power supply voltage detection means that detects a voltage of the direct current power supply (3), as well as a power supply voltage versus potential setting means that makes the set potential ($V_{SET}$) smaller as the direct current power supply (3) voltage that has been detected by the power supply voltage detection means becomes smaller, makes it possible for the set potential ($V_{SET}$) to be set in accordance with the voltage that is applied to the electric motor (2). The same sort of effect can thus be achieved as was achieved by ninth aspect.

In the same manner, for the invention that is described in each of the aspects described above, providing, as thirteenth aspect does, a power supply voltage detection means that detects a voltage of the direct current power supply (3), as well as a first threshold potential setting means that makes the first threshold potential (Vth1) smaller as the direct current power supply (3) voltage that has been detected by the power supply voltage detection means becomes smaller, makes it possible for the first threshold potential (Vth1) to be set in accordance with the voltage that is applied to the electric motor (2). The same sort of effect can thus be achieved as was achieved by ninth and twelfth aspects.

Note that the reference numerals in parentheses for each of the means that are described above indicate correspondences with specific means that are described in the embodiments that are hereinafter described.

BRIEF DESCRIPTION OF DRAWINGS

FIG. 3 is a pair of timing charts that show how a motor current and the motor supply voltage change over time when the electric motor 2 is turned on.

DESCRIPTION OF EMBODIMENTS

Hereinafter, embodiments of the present invention will be explained based on the drawings. Note that portions that are the same or equivalent in each of the embodiments are assigned the same reference numerals in the drawings.

First Embodiment

Figure 1:
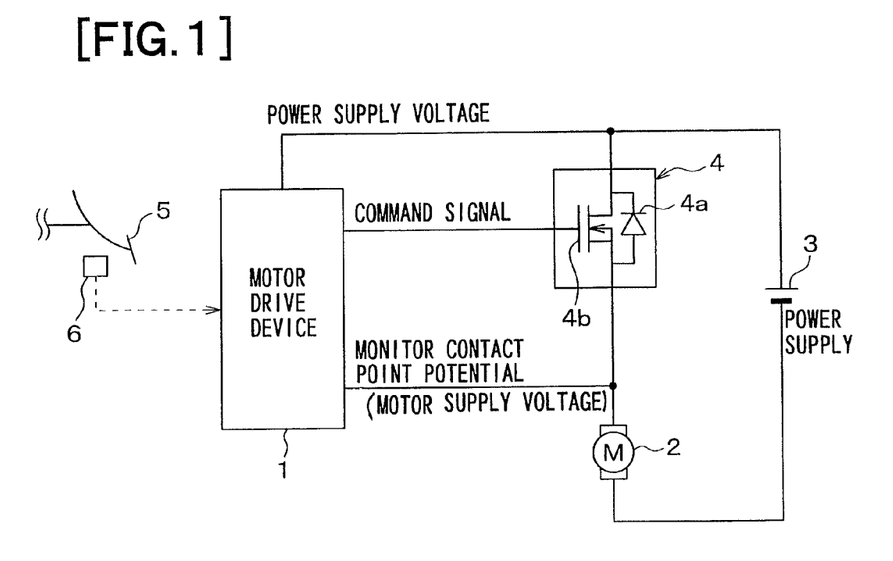
FIG. 1 is a figure that shows a motor drive device according to a first embodiment of the present invention and an overall configuration of a drive circuit and the like for an electric motor 2 that is driven by a motor drive device 1.

A first embodiment of the present invention will be explained. FIG. 1 is a figure that shows a motor drive device 1 according to the present embodiment and an overall configuration of a drive circuit and the like for an electric motor 2 that is driven by the motor drive device 1. First, the motor drive device 1 and the drive circuit and the like for the electric motor 2 will be explained with reference to FIG. 1.

The motor drive device 1 is configured from a known microcomputer that is provided with a CPU, a ROM, a RAM, an input/output function, and the like, and by controlling an electric power supply to the electric motor 2 from a direct current power supply 3, in accordance with a program that has been stored in advance, it controls the electric motor 2 such that the electric motor 2 turns at a desired revolution speed. The electric motor 2 may be used as a drive motor for an electric pump (not shown in the drawings) that controls brake hydraulic pressure, for example. In that case, when anti-skid control is performed, the brake fluid that is discharged from the wheel cylinder of the wheel that is the object of the anti-skid control by the operation of the pump, which is based on the drive of the electric motor 2, returns to the master cylinder side, and when side slip prevention control, traction control, or the like is performed, the brake fluid is pumped from the master cylinder side by the operation of the pump, which is based on the drive of the electric motor 2, and pressure is increased in the wheel cylinder of the wheel that is the object of the control.

The motor drive device 1 controls the electric power supply to the electric motor 2 by controlling a switching element 4 that is provided in an electric power supply path for the electric motor 2. In the present embodiment, a drive circuit for high-side drive is provided, in which the switching element 4 is connected to the high side of the electric motor 2, and the electric power supply to the electric motor 2 is controlled by controlling the switching element 4 on the high side of the electric motor 2. Specifically, the motor drive device 1 turns the switching element 4 on and off by outputting command signals to the switching element 4. For example, a MOS transistor 4b that is provided with a flyback diode 4a is used as the switching element 4, and the MOS transistor 4b is switched on and off by controlling the gate voltage that is applied to the gate of the MOS transistor 4b.

The motor drive device 1 also monitors the electric potential (hereinafter called the contact point potential) at the point where the electric motor 2 and the switching element 4 are connected. In the present embodiment, the motor drive device 1 uses high-side drive to drive the electric motor 2, so the contact point potential indicates the voltage (hereinafter called the motor supply voltage) that is supplied to the electric motor 2 when the switching element 4 is switched on. Further, when the switching element 4 is switched from on to off, the contact point potential indicates a regeneration voltage that is in accordance with the revolution speed of the electric motor 2. Therefore, by monitoring the contact point potential, the motor drive device 1 can monitor the motor supply voltage when the switching element 4 is on and can monitor the regeneration voltage when the switching element 4 is switched from on to off. The motor drive device 1 also performs failure determination for the electric motor 2 and the switching element 4 by determining, based on the result of the contact point potential monitoring, whether the desired voltage is being supplied to the electric motor 2 and the like. The failure determination will be described in detail later.

The voltage (power supply voltage) of the direct current power supply 3 is also input to the motor drive device 1, such that the motor drive device 1 can monitor the voltage level of the direct current power supply 3. A detection signal is also input to the motor drive device 1 from an operation amount detection unit 6 that detects an amount of operation of a brake operating member 5 such as a brake pedal, a brake lever, or the like. The motor drive device 1 can monitor the amount of operation of the brake operating member 5 based on the detection signal from the operation amount detection unit 6.

Next, the failure determination by the motor drive device 1 will be explained in detail. When the motor drive device 1 according to the present embodiment will drive the electric motor 2, such as when the aforementioned anti-skid control, side slip prevention control, traction control, or the like will be performed, for example, the motor drive device 1 drives the electric motor 2 by outputting a command signal, but before doing so, the motor drive device 1 performs the failure determination, such as during an initial check that is performed when the ignition switch is turned on, for example. First, the basic concept of the failure determination will be explained.

Failure modes that one would want to determine include a case in which the electric motor 2 has failed because its rotating shaft has become stuck or the like, and a case in which the switching element 4 has failed, as when a large voltage drop occurs at the switching element 4, such that it cannot supply the desired voltage to the electric motor 2. In a case where the voltage of the direct current power supply 3 is a fixed value, the way in which the motor supply voltage changes when the switching element 4 is switched on and the electric power is supplied to the electric motor 2 and the way in which the regeneration voltage changes when the electric motor 2 is switched from on to off differ according to the failure mode. This will be explained with reference to FIG. 2.

Figure 2:
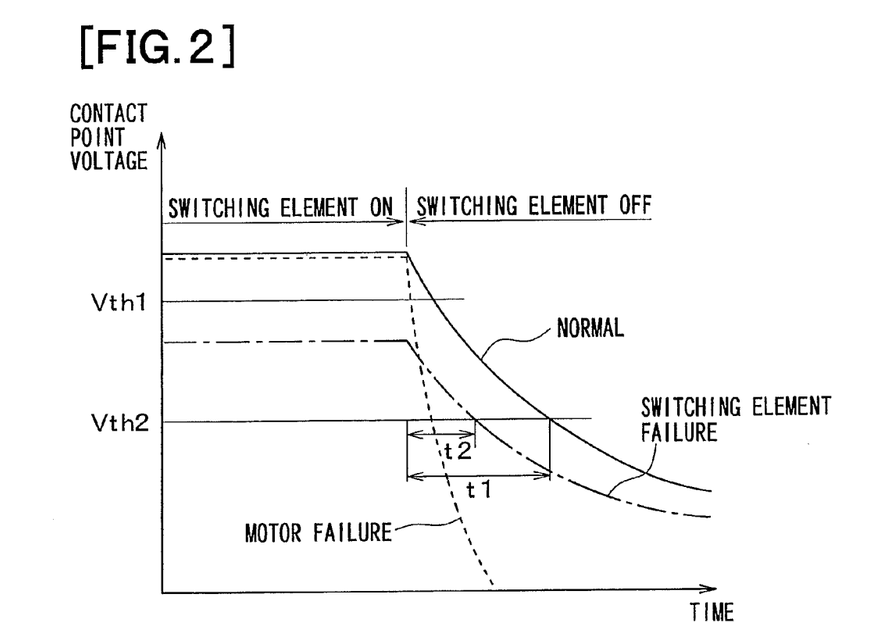
FIG. 2 is a timing chart that shows relationships between failure modes and a contact point potential (a motor supply voltage and a regeneration voltage).

FIG. 2 is a timing chart that shows relationships between the failure modes and the contact point potential (the motor supply voltage and the regeneration voltage). In a case where neither the electric motor 2 nor the switching element 4 has failed while the electric power is being supplied with the switching element 4 switched on, as shown by a solid line in FIG. 2, the motor supply voltage to the electric motor 2 is the voltage that remains after the normal voltage drop at the switching element 4 is subtracted from the voltage of the direct current power supply 3, and that is detected as the contact point potential. Then, immediately after the switching element 4 is switched off, the regeneration voltage that is in accordance with the revolution speed of the electric motor 2 is detected as the contact point potential. The mode of the change in the regeneration voltage at this time corresponds to the value of the voltage that was being applied to the electric motor 2 when the switching element 4 was switched on and to the duration of the application of the voltage to the electric motor 2.

Furthermore, in a case where the electric motor 2 has failed, the voltage that is applied to the electric motor 2 while the electric power is being supplied with the switching element 4 switched on is the same as when the electric motor 2 has not failed, as shown by the broken line in FIG. 2, but the mode of the change in the regeneration voltage immediately after the switching element 4 is switched off is different from when the electric motor 2 has not failed. Specifically, when the rotating shaft of the electric motor 2 has become stuck, the turning of the electric motor 2 is impeded, so at the same time that the switching element 4 is switched off, the regeneration voltage drops abruptly. The speed of the regeneration voltage drop at this time is faster than when the electric motor 2 has not failed. Therefore, a determination can be made as to whether or not the electric motor 2 has failed, based on the mode of the change in the contact point potential after the switching element 4 has been switched off, that is, the way that the contact point potential drops.

In a case where the switching element 4 has failed, the voltage that is applied to the electric motor 2 while the electric power is being supplied with the switching element 4 switched on is less than when the switching element has not failed, as shown by the dashed-dotted line in FIG. 2. In other words, because the voltage drop at the switching element 4 becomes greater, the motor supply voltage is diminished to that extent. In addition, the mode of the change in the regeneration voltage immediately after the switching element 4 is switched off is different from what it is in a case where the switching element 4 has not failed. That is, because the motor supply voltage while the electric power is being supplied with the switching element 4 switched on varies according to whether or not the switching element 4 has failed, the revolution speed of the electric motor 2 also varies according to whether or not the switching element 4 has failed. Therefore, the regeneration voltage is also a value that varies according to whether or not the switching element 4 has failed, and in a case where the switching element 4 has failed, the contact point potential reaches a low value more quickly than in a case where the switching element 4 has not failed. At this time, the electric motor 2 has not failed, so the drop in the revolution speed of the electric motor 2 is gradual, and the regeneration voltage also decreases comparatively gradually. Therefore, it is possible to determine whether or not the switching element 4 has failed based on whether the contact point potential is high or low when the switching element 4 is switched on and on the mode of the change in the contact point potential, that is, the way that the contact point potential drops, after the switching element 4 has been switched off.

Based on the basic concept that is described above, it is possible for the motor drive device 1 according to the present embodiment to determine whether the electric motor 2 has failed and whether the switching element 4 has failed.

Figure 3:
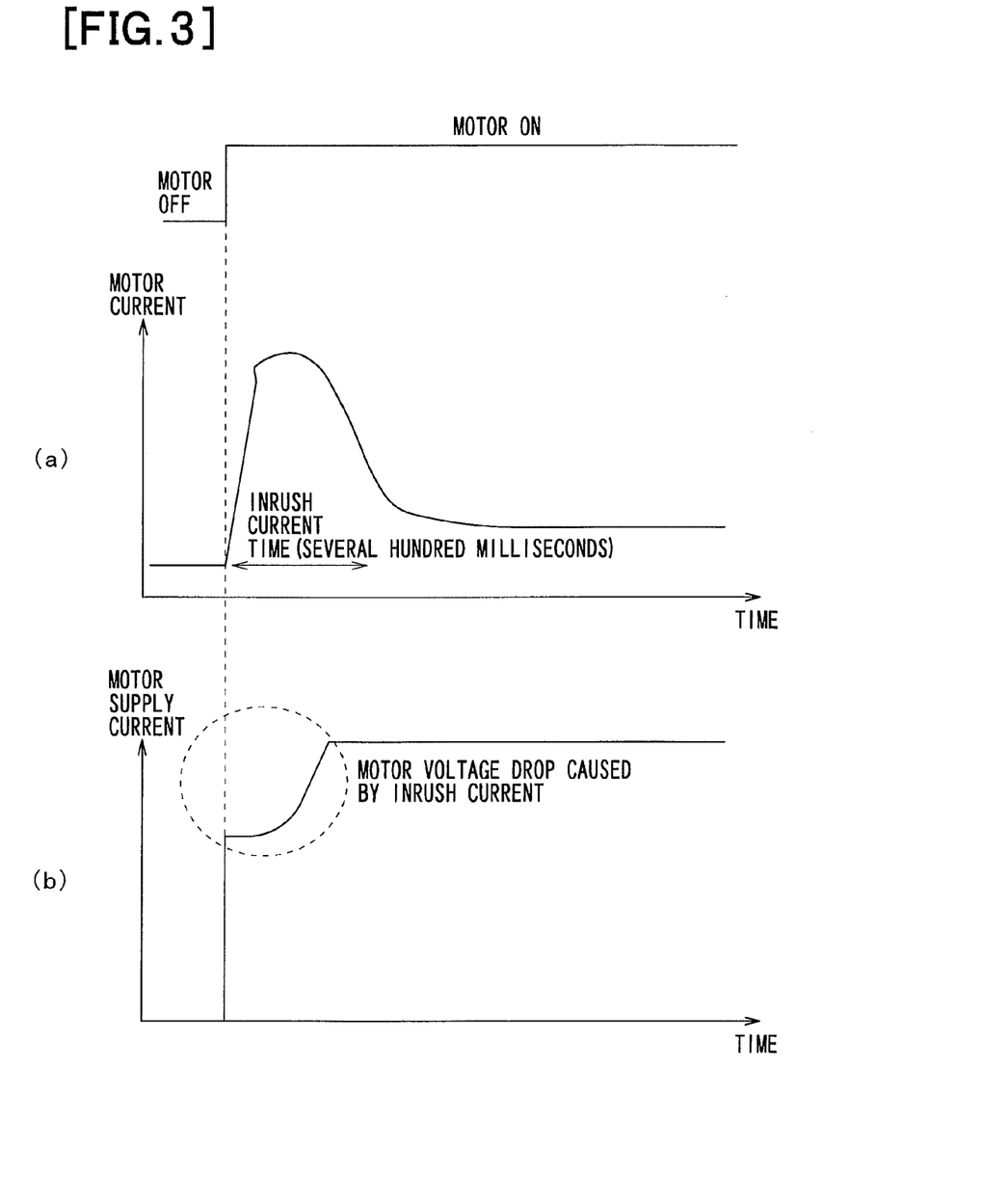

However, at the instant when the electric motor 2 is switched from off to on, an inrush current is generated that causes the value of the electric current (a motor current) that is supplied to the electric motor 2 to become greater for a predetermined time interval (for example, several hundred milliseconds), so the voltage drop at the switching element 4 becomes greater. This state is indicated by timing charts that are shown in FIG. 3(*a*) and FIG. 3(*b*), which respectively show the changes in the motor current over time and the changes in the motor supply voltage over time. This means that during the interval when the inrush current is being generated, the possibility exists that the motor supply voltage will be detected as a low value, such that the switching element 4 will be mistakenly determined to have failed. It is therefore necessary not to determine that the switching element 4 has failed based on the contact point potential during the interval when the inrush current is being generated, and to perform the failure determination based on the contact point potential after the electric motor 2 has transitioned to a steady state.

However, waiting until the motor supply voltage reaches a steady state in order to avoid the period when the inrush current is being generated increases the time that is spent on the failure determination, which in turn increases the time during which the electric power is supplied to the electric motor 2 during the failure determination. In this case, the electric motor 2 is not turned for the intrinsic purpose of performing control, but is turned for the purpose of the failure determination instead, so the operating noise and vibration of the electric motor 2 are generated for a longer time interval, making the electric motor 2 less attractive as a product. It is therefore desirable to make the time that is required for the failure determination and the time that the electric motor 2 is operated for the failure determination as short as possible.

On the other hand, if it could be determined before the failure determination has been fully completed that neither the electric motor 2 nor the switching element 4 has failed, terminating the failure determination early would make it possible to make the time that is required for the failure determination and the time that the electric motor 2 is operated for the failure determination shorter than in a case where the failure determination is fully completed. Therefore, in the present embodiment, the failure determination is performed as hereinafter described. This will be explained with reference to FIG. 4.

Figure 4:
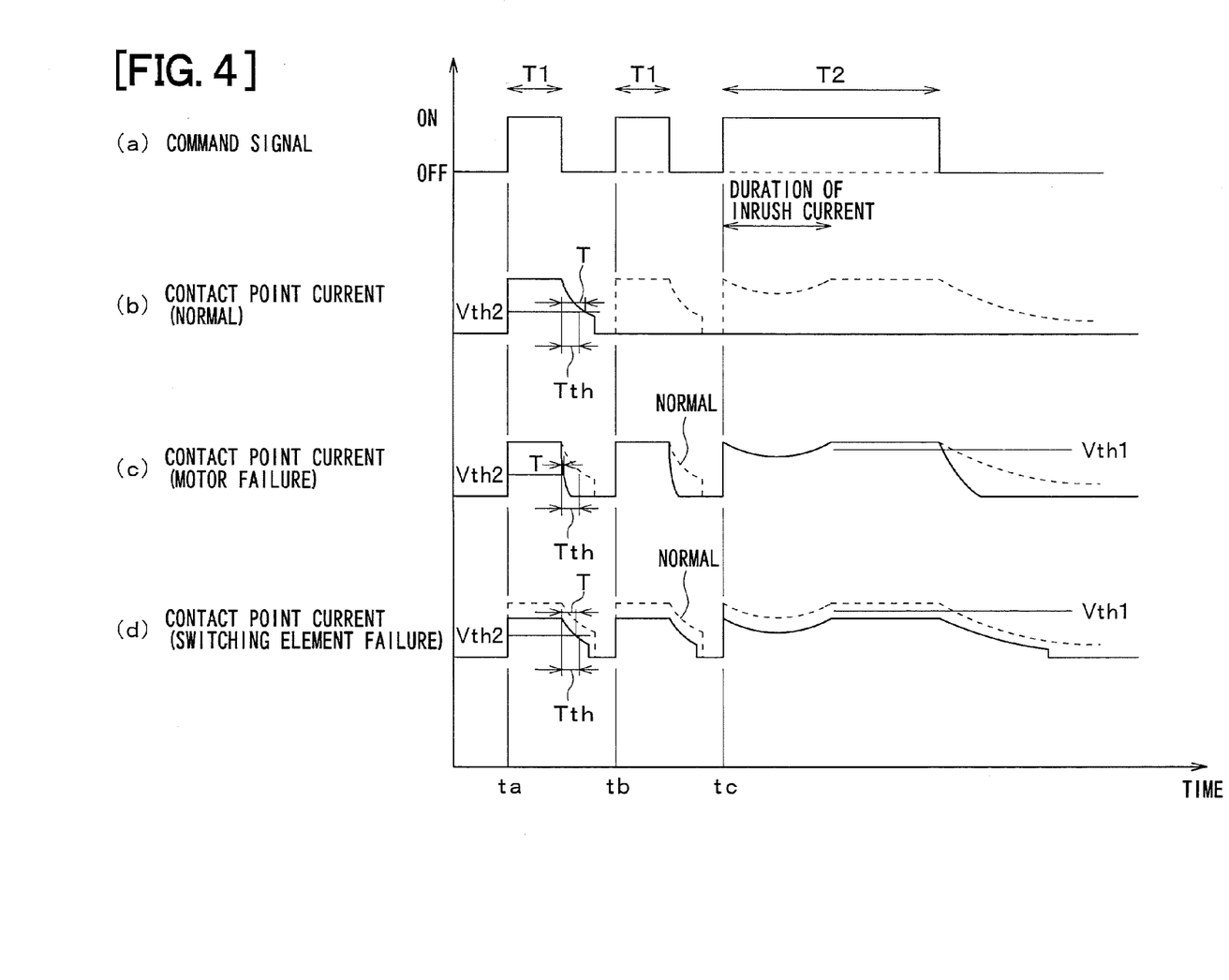
FIG. 4 is a timing chart that shows waveforms of a command signal to a switching element 4 and of the motor supply voltage in relation to the command signal.

FIG. 4 is a timing chart that shows waveforms of the command signal to the switching element 4 and of the contact point potential in relation to the command signal. Specifically, FIG. 4(*a*) shows a waveform that indicates the command signal to the switching element 4, FIG. 4(*b*) shows the waveform of the contact point potential in a case where the electric motor 2 and the switching element 4 are both normal, FIG. 4(*c*) shows the waveform of the contact point potential in a case where the switching element 4 has failed, and FIG. 4(*d*) shows the waveform of the contact point potential in a case where the electric motor 2 has failed.

First, the motor drive device 1 outputs a command signal that turns the switching element 4 on at a time point to and keeps the switching element 4 on for only a first predetermined time interval T1. The first predetermined time interval T1 during which the motor drive device 1 keeps the switching element 4 on at this time is set irrespective of whether or not it is included by a duration of the inrush current during which the inrush current is generated, and the supply of the electric power to the electric motor 2 is continued throughout the time interval T1. Then the motor drive device 1 switches the switching element 4 from on to off. Then the motor drive device 1 acquires the contact point potential from the time when the switching element 4 was switched to off and checks the mode of the change in the contact point potential (the regeneration voltage). In other words, the motor drive device 1 determines whether the mode of the change in the contact point potential is a mode that is expected in a case where both the electric motor 2 and the switching element 4 are normal or a mode that is expected in a case where one of the electric motor 2 and the switching element 4 has failed.

Specifically, the time that elapses from when the switching element 4 is switched off until the contact point potential becomes equal to or smaller than a second threshold potential Vth2 is measured as a measurement time interval T, and if the measurement time interval T is equal to or larger than a threshold time interval Tth, the mode of the change in the contact point potential is determined to be the mode that is expected in a case where both the electric motor 2 and the switching element 4 are normal. Conversely, if the measurement time interval T is less than the threshold time interval Tth, the mode of the change in the contact point potential is determined to not be the mode that is expected in a case where both the electric motor 2 and the switching element 4 are normal. As shown in FIG. 2, the threshold time interval Tth is set to be shorter than a measurement time interval t1 at a time when the electric motor 2 and the switching element 4 are expected to be normal and not to have failed and longer than a measurement time interval t2 at a time when the switching element 4 is expected to have failed. Therefore, by determining whether or not the measurement time interval T is equal to or larger than the threshold time interval Tth, the motor drive device 1 is able to distinguish between a case in which both the electric motor 2 and the switching element 4 are normal and a case in which one of the electric motor 2 and the switching element 4 has failed.

If the motor drive device 1 determines that the mode of the change in the contact point potential is the mode that is expected in a case where both the electric motor 2 and the switching element 4 are normal, that is, if the motor drive device 1 determines that the electric motor 2 and the switching element 4 are normal and a failure has not occurred, the motor drive device 1 then terminates the processing for the failure determination at that point in time. In that case, the command signal to the switching element 4 becomes a signal that switches the switching element 4 to off, as shown by the broken line in FIG. 4(*a*), and the processing for the failure determination is terminated. Note that in that case, the switching element 4 will not be switched on thereafter, so the contact point potential becomes zero, as shown by the solid line in FIG. 4(*b*), but to make it easier to compare with a case in which the failure determination is continued thereafter, the waveform of the contact point potential in a case where the failure determination is continued is shown by a broken line in the drawing.

On the other hand, in a case where the mode of the change in the contact point potential is not the mode that is expected in a case where both the electric motor 2 and the switching element 4 are normal (the measurement time interval T is less than the threshold time interval Tth), the failure determination continues thereafter. Specifically, the switching element 4 is switched on at a time point tb, the switching element 4 is switched off again after the first predetermined time interval T1 has elapsed, and the processing that checks the mode of the change in the contact point potential at this time is performed once again. If the mode of the change in the contact point potential is still not the mode that is expected in a case where both the electric motor 2 and the switching element 4 are normal even though the processing is performed thus twice in a row, processing is then performed that determines which one of the electric motor 2 and the switching element 4 has failed.

Specifically, the motor drive device 1 switches the switching element 4 on at a time point tc, then outputs a command signal that causes the switching element 4 to stay on for only a second predetermined time interval T2. The second predetermined time interval T2 during which the motor drive device 1 keeps the switching element 4 on at this time is set to a time interval that it is longer than the first predetermined time interval T1 and longer than the duration of the inrush current during which the inrush current is generated, and the supply of the electric power to the electric motor 2 is continued throughout the time interval T2. Then the motor drive device 1 switches the switching element 4 from on to off. Then the motor drive device 1 acquires the contact point potential from the time when the switching element 4 was switched to off and, based on the magnitude of the contact point potential, determines which one of the electric motor 2 and the switching element 4 has failed.

Specifically, the motor drive device 1 determines that the electric motor 2 has failed if the contact point potential has exceeded a first threshold potential Vth1 and determines that the switching element 4 has failed if the contact point potential has not exceeded a first threshold voltage Vth. As explained previously, when the electric motor 2 has failed, the motor supply voltage that is applied to the electric motor 2 is the same voltage as when a failure has not occurred, but when the switching element 4 has failed, the voltage drop at the switching element 4 becomes greater, so the motor supply voltage is a lower voltage than when a failure has not occurred. Therefore, as shown in FIG. 2, a value that is less than the motor supply voltage that is expected when a failure has not occurred and that is greater than the motor supply voltage that is expected when the switching element 4 has failed is defined as a first threshold voltage Vth1, and the determination as to which one of the electric motor 2 and the switching element 4 has failed can be made based on whether or not the contact point potential has exceeded the first threshold voltage Vth1.

As explained above, in the motor drive device 1 according to the present embodiment, first, the switching element 4 switched off after being on for only the short time interval called the first predetermined time interval T1, and based on the mode of the change in the contact point potential when the switching element 4 is switched off, a determination is made as to whether or not one of the electric motor 2 and the switching element 4 has failed. Next, the switching element 4 is switched on for the time interval that is called the second predetermined time interval T2, which is longer than the first predetermined time interval T1, and based on the magnitude of the contact point potential at that time, the motor drive device 1 determines which one of the electric motor 2 and the switching element 4 has failed. This makes it possible for the motor drive device 1 to detect a failure of the switching element 4, in addition to a failure of the electric motor 2.

Furthermore, in a case where it is determined that neither the electric motor 2 nor the switching element 4 has failed, based on the change in the contact point potential when the switching element 4 is switched off after being on for only the first predetermined time interval T1, the failure determination is not performed thereafter. Therefore, when a failure has not occurred, it is possible to shorten the time that is required for the failure determination, and the failure determination is terminated without letting the operating noise and vibration of the electric motor 2 be generated for a long time interval, so the attractiveness of the electric motor 2 as a product is not diminished.

Second Embodiment

A second embodiment of the present invention will be explained. The motor drive device 1 according to the present embodiment is the same as the motor drive device 1 according to the first embodiment, except that the threshold time interval Tth can be varied, so only the part that is different from the first embodiment will be explained.

As explained previously, the threshold time interval Tth is the value that is compared to the measurement time interval T that elapses from when the switching element 4 is switched off until the contact point potential (the regeneration voltage) becomes equal to or smaller than the second threshold potential Vth2. In the first embodiment, the switching element 4 is switched on during the initial check, and by comparing the contact point potential at that time to the first threshold voltage Vth1, a determination is made as to whether or not one of the electric motor 2 and the switching element 4 has failed. Basically, it is assumed that the brake is not operated during the initial check, so it is possible to perform the failure determination easily. However, the possibility also exists that the brake will be operated during the initial check. Furthermore, while brake control is being performed, an intermittent drive is performed that applies the motor supply voltage to the electric motor 2 intermittently, making it difficult to determine whether or not the detected contact point potential is the contact point potential when the switching element 4 is switched on, so basically, it is preferable to perform the failure determination when the brake control is not being performed. However, the electric motor 2 and the switching element 4 can also fail during or after the initial check, so it is conceivable that the failure determination will be performed when the electric motor 2 is driven while the brake control is being performed.

Therefore, in the present embodiment, the failure determination can be performed accurately by performing the failure determination in accordance with the amount of operation of the brake operating member 5, even if there is a change in the mode of the change in the contact point potential according to the load that bears on the electric motor 2 at the time that the supply of the electric power is stopped.

Specifically, because the brake fluid pressure that is based on the brake operation bears on the electric pump, the load on the electric motor 2 increases, and a change occurs in the mode of the change in the contact point potential according to the magnitude of the load at the time that the supply of the electric power is stopped. Therefore, the motor drive device 1 accepts from the operation amount detection unit 6 the detection signal that indicates the amount of operation of the brake operating member 5, monitors the amount of operation of the brake operating member 5 based on the detection signal, and during the failure determination, varies the threshold time interval Tth in accordance with the amount of operation of the brake operating member 5 at that time. That is, even if neither the electric motor 2 nor the switching element 4 has failed, the measurement time interval T that elapses from when the switching element 4 is switched off until the contact point potential becomes equal to or smaller than the second threshold potential Vth2 becomes shorter as the load that bears on the electric motor 2 becomes greater. Therefore, the threshold time interval Tth is made shorter as the amount of operation of the brake operating member 5 becomes greater.

Thus, even if the load that bears on the electric motor 2 increases based on the amount of operation of the brake operating member 5, the failure determination can be performed accurately, because the threshold time interval Tth is varied in accordance with the increase in the load.

Third Embodiment

A third embodiment of the present invention will be explained. The motor drive device 1 according to the present embodiment is the same as the motor drive device 1 according to the first embodiment, except that the threshold time interval Tth can be varied, so only the part that is different from the first embodiment will be explained.

As explained previously, the threshold time interval Tth is the value that is compared to the measurement time interval T that elapses from when the switching element 4 is switched off until the contact point potential becomes equal to or smaller than the second threshold potential Vth2. In the first embodiment, the threshold time interval Tth is set such that it is shorter than the measurement time interval t1 at a time when the electric motor 2 and the switching element 4 are expected to be normal and not to have failed and longer than the measurement time interval t2 at a time when the switching element 4 is expected to have failed, as shown in FIG. 2. The setting is made on the assumption that the voltage level of the direct current power supply 3 is a fixed value (for example, 12 volts).

However, the voltage level of the direct current power supply 3 sometimes varies, and in that case, the voltage that is applied to the electric motor 2 when the switching element 4 is switched on also varies. Therefore, the motor supply voltage also varies in accordance with the voltage level of the direct current power supply 3, and so does the time that elapses from when the switching element 4 is switched off until the contact point potential becomes equal to or smaller than the second threshold potential Vth2

Therefore, in the present embodiment, the failure determination can be performed accurately by performing the failure determination in accordance with the voltage level of the direct current power supply 3, even if there is a change in the mode of the change in the contact point potential according to the voltage that is supplied to the electric motor 2 at the time that the supply of the electric power is stopped.

Specifically, the motor drive device 1 monitors the voltage of the direct current power supply 3 and during the failure determination, varies the threshold time interval Tth based on the voltage of the direct current power supply 3 at that time. That is, even if neither the electric motor 2 nor the switching element 4 has failed, the measurement time interval T that elapses from when the switching element 4 is switched off until the contact point potential becomes equal to or smaller than the second threshold potential Vth2 becomes shorter as the voltage that is applied to the electric motor 2 becomes smaller. Therefore, the threshold time interval Tth is made shorter as the voltage of the direct current power supply 3 becomes smaller.

Thus, even if the voltage that is applied to the electric motor 2 varies in accordance with the variation in the voltage level of the direct current power supply 3, the failure determination can be performed accurately, because the threshold time interval Tth is varied in accordance with the variation in the voltage.

Fourth Embodiment

A fourth embodiment of the present invention will be explained. The motor drive device 1 according to the present embodiment uses a different technique than was used in the first embodiment to determine whether the electric motor 2 and the switching element 4 are normal or whether one of them has failed. In all other respects, the motor drive device 1 is the same as in the first embodiment, so only the part that is different from the first embodiment will be explained.

In the present embodiment, in the same manner as in the first to the third embodiments, after the switching element 4 has been switched on for only the first predetermined time interval T1, the switching element 4 is switched off, and in accordance with the mode of the subsequent change in the contact point potential, a determination is made as to whether the electric motor 2 and the switching element 4 are normal or whether one of them has failed. However, in the present embodiment, a determination technique is used that is different from the technique in the first to the third embodiments. This will be explained with reference to FIG. 5.

Figure 5:
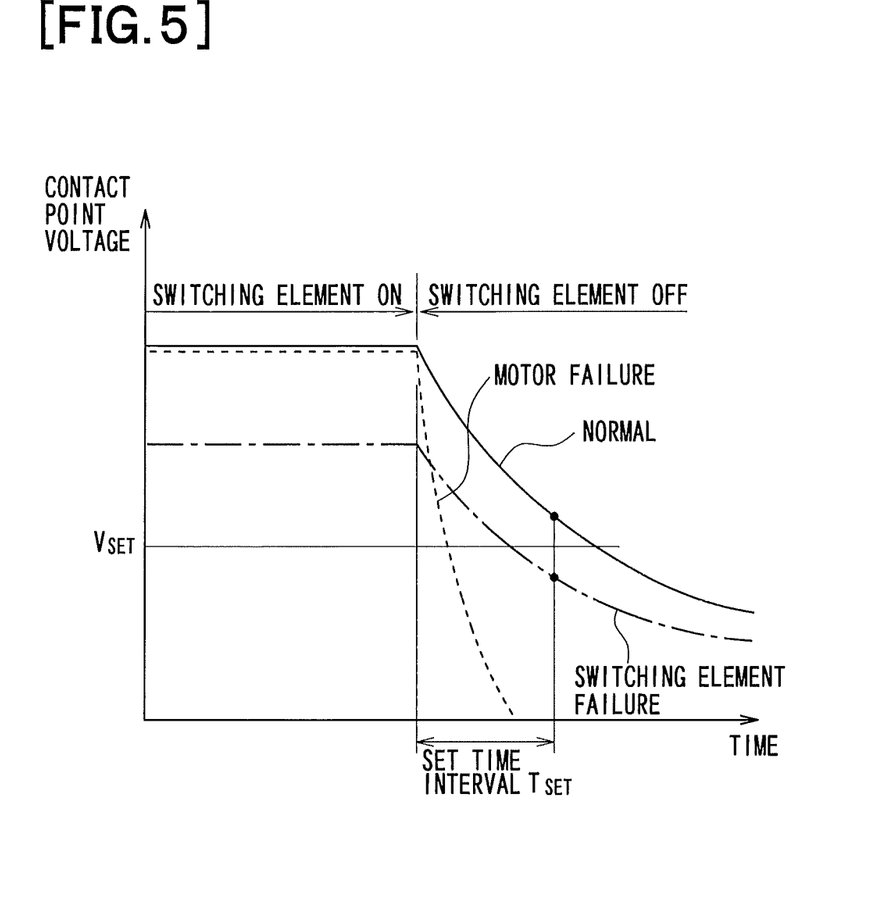
FIG. 5 is a timing chart that shows relationships between the failure modes and the motor supply voltage.

FIG. 5 is a timing chart that shows relationships between the failure modes and the contact point potential (the motor supply voltage and the regeneration voltage). As shown in FIG. 5, the mode of the change in the contact point potential differs according to whether the electric motor 2 and the switching element 4 are normal or whether one of them has failed. In a case where one of the electric motor 2 and the switching element 4 has failed, the contact point potential has a lower value than in a case where the electric motor 2 and the switching element 4 are both normal.

Therefore, in the present embodiment, when the switching element 4 is switched off after having been switched on for only the first predetermined time interval T1, the motor drive device 1 acquires the contact point potential after a predetermined set time interval $T_{SET}$ has elapsed since the switching element 4 was switched off, and based on the magnitude of the contact point potential, the motor drive device 1 determines whether the electric motor 2 and the switching element 4 are normal or whether one of them has failed. Specifically, if the contact point potential at this time is equal to or larger than a predetermined set potential $V_{SET}$, the determination is made that the electric motor 2 and the switching element 4 are normal, and if the contact point potential is less than the set potential $V_{SET}$, the determination is made that either the electric motor 2 or the switching element 4 has failed.

As described above, the determination as to whether the electric motor 2 and the switching element 4 are normal or whether one of them has failed can be made based on the magnitude of the contact point potential after the set time interval $T_{SET}$ has elapsed since the switching element 4 was switched off. After the determination as to whether the electric motor 2 and the switching element 4 are normal or whether one of them has failed has been made by the technique that is described above, the failure determination is terminated if the electric motor 2 and the switching element 4 are normal, and if one of them has failed, it is then possible to determine which one of the electric motor 2 and the switching element 4 has failed by switching the switching element 4 to on for only the second predetermined time interval T2. The same sort of effect as is achieved by the first embodiment can also be achieved by this sort of determination technique.

Note that in the present embodiment, as was explained in the second embodiment, the set potential $V_{SET}$ can be varied based on the amount of operation of the brake operating member 5. Specifically, because the load that bears on the electric motor 2 varies according to the amount of operation of the brake operating member 5, a change occurs in the mode of the change in the contact point potential according to the magnitude of the load at the time that the supply of the electric power is stopped. Therefore, the motor drive device 1 accepts from the operation amount detection unit 6 the detection signal that indicates the amount of operation of the brake operating member 5, monitors the amount of operation of the brake operating member 5 based on the detection signal, and during the failure determination, varies the set potential $V_{SET}$ in accordance with the amount of operation of the brake operating member 5 at that time. Specifically, the set potential $V_{SET}$ becomes smaller as the amount of operation of the brake operating member 5 becomes greater. Thus, even if the load that bears on the electric motor 2 increases based on the operation of the brake operating member 5, the failure determination can be performed accurately, because the set potential $V_{SET}$ is varied in accordance with the increase in the load.

Furthermore, as was explained in the third embodiment, the set potential $V_{SET}$ can be varied based on the voltage of the direct current power supply 3. That is, the motor supply voltage varies in accordance with the voltage level of the direct current power supply 3. Therefore, the motor drive device 1 monitors the voltage of the direct current power supply 3, and during the failure determination, varies the set potential $V_{SET}$ based on the voltage of the direct current power supply 3 at that time. Thus, even if the voltage that is applied to the electric motor 2 varies in accordance with the variation in the voltage level of the direct current power supply 3, the failure determination can be performed accurately, because the set potential $V_{SET}$ is varied in accordance with the variation in the voltage.

Other Embodiments

In the first to the fourth embodiments, the processing sequence in which, after the switching element 4 has been switched on for only the first predetermined time interval T1, the switching element 4 is switched from on to off, and the contact point potential (the regeneration voltage) is then acquired, is performed only two times. However, the processing sequence may also be performed only one time and may also be performed three times or more. If the processing sequence is performed only one time, the failure determination can be implemented in the form of simple processing. As the number of times that the processing sequence is performed is increased, the determination as to whether one of the electric motor 2 and the switching element 4 has failed can be made more accurately.

In a case where a processing sequence like that described above is performed a plurality of times, it is preferable for the first predetermined time interval T1 to be different at each stage. Determining whether one of the electric motor 2 and the switching element 4 has failed based on a plurality of the regeneration voltages that have been acquired under different conditions makes it possible to improve the accuracy of the determination even more.

In that case, it is particularly desirable to make the first predetermined time interval T1 at each one of the plurality of times shorter as the one of the plurality of times occurs earlier. If it was determined in a preceding time of the processing that neither the electric motor 2 nor the switching element 4 has failed, the processing is not performed again, so the time that the electric motor 2 is operated can be shortened. In other words, even as the accuracy of the failure determination is improved, the time interval during which the operating noise and vibration of the electric motor 2 are generated can be shortened.

In this case, the mode of the change in the regeneration voltage also varies from one round to the next according to the first predetermined time interval T1, that is, the time interval when the electric power is being supplied to the electric motor 2, so it is preferable for the threshold values for evaluating a regeneration voltage that is acquired in each round (the threshold time interval Tth, a set voltage $V_{SET}$) to be set according to the first predetermined time interval T1 for that round. This makes it possible to determine even more accurately whether or not one of the electric motor 2 and the switching element 4 has failed.

In the third embodiment, the threshold time interval Tth varies based on the voltage of the direct current power supply 3, and in the fourth embodiment, the set potential $V_{SET}$ varies based on the voltage of the direct current power supply 3. In the same manner, the first threshold potential Vth1 can also vary based on the voltage of the direct current power supply 3 in each of the embodiments that have been described. When it has been determined that one of the electric motor 2 and the switching element 4 has failed, the first threshold potential Vth1 is the value that is compared to the contact point potential in order to determine which one has failed. The contact point potential at this time is not the regeneration voltage, but the motor supply voltage at the time when the switching element 4 has been switched on. The motor supply voltage also varies according to the voltage level of the direct current power supply 3, so it is preferable for the first threshold potential Vth1 also to be varied according to the voltage level of the direct current power supply 3. Therefore, making the first threshold potential Vth1 smaller as the voltage of the direct current power supply 3 becomes smaller makes it possible to determine more accurately which one of the electric motor 2 and the switching element 4 has failed.

Each of the embodiments that have been described has been explained using the MOS transistor 4b as an example of the switching element 4, but the switching element 4 is not limited to being the MOS transistor 4b, and other elements (for example, an IGBT, a relay, or the like) can also be used.

Furthermore, in each of the embodiments that have been described, after the determination has been made as to whether or not a component including the electric motor 2 and the switching element 4 has failed, the determination is made that determines which one of the electric motor 2 and the switching element 4 has failed. However, this is merely an illustrative example, and the order in which these determinations are made may also be reversed. That is, the failure determination technique may also be one in which, after a determination is made as to which one of the electric motor 2 and the switching element 4 has possibly failed, the determination is made as to whether or not the component including the electric motor 2 and the switching element 4 has failed. Moreover, in this case, the determination a determination is made as to which one of the electric motor 2 and the switching element 4 has possibly failed and the determination as to whether or not the component including the electric motor 2 and the switching element 4 has failed may also be made at the same time that the switching element 4 is switched on once. That is, the determination a determination is made as to which one of the electric motor 2 and the switching element 4 has possibly failed is made, based on the contact point potential when the switching element 4 is switched on for only second predetermined time interval T2, and then the determination as to which one of the electric motor 2 and the switching element 4 has failed is made, based on the mode of the change in the contact point potential when the switching element 4 was switched off.

Note that in the motor drive device 1 that is described in each of the embodiments, means have been provided that implement various functions according to a program that has been stored in advance. That is, in the motor drive device 1, a means that outputs the command signal that switches the switching element 4 on for only the first predetermined time interval T1 is equivalent to a first electric power supply control means. A means that acquires the contact point potential at the time after the switching element 4 is switched off after being on for the first predetermined time interval T1 is equivalent to a first contact point potential acquisition means. A means that outputs the command signal that switches the switching element 4 on for only the second predetermined time interval T2 is equivalent to a second electric power supply control means. A means that acquires the contact point potential at the time after the switching element 4 is switched off after being on for the second predetermined time interval T2 is equivalent to a second contact point potential acquisition means. A means that determines whether the mode of the change in the contact point potential that is associated with the stopping of the electric power supply to the electric motor 2 is the mode when the electric motor 2 and the switching element 4 are normal or is the mode when the electric motor 2 or the switching element 4 has failed is equivalent to a first determination means. A means that determines whether or not the contact point potential that has been acquired by the second contact point potential acquisition means is equal to or larger than the first threshold potential Vth1 is equivalent to a second determination means. A means that determines which one of the electric motor 2 and the switching element 4 has failed based on the results from the first and the second determination means is equivalent to a failure diagnosis means. A means that makes the threshold time interval Tth smaller as the operation amount of the brake operating member 5 becomes greater is equivalent to a brake operation amount versus threshold time interval setting means. A means that makes the threshold time interval Tth smaller as the voltage of the direct current power supply 3 becomes smaller is equivalent to a power supply voltage versus threshold time interval setting means. A means that makes the set potential $V_{SET}$ smaller as the operation amount of the brake operating member 5 becomes greater is equivalent to a brake operation amount versus potential setting means. A means that makes the set potential $V_{SET}$ smaller as the voltage of the direct current power supply 3 becomes smaller is equivalent to a power supply voltage versus potential setting means.

REFERENCE SIGNS LIST

1 Motor drive unit
2 Motor
3 Direct current power supply
4 Switching element
5 Brake operating member
6 Operation amount detection unit

The invention claimed is:
1. A motor drive device that is used for a drive circuit for an electric motor, the drive circuit including a direct current power supply that supplies electric power to the electric motor and a switching element that switches on and off an electric power supply path between the electric motor and the direct current power supply, the motor drive device using the switching element to control supply of the electric power to the electric motor, the motor drive device comprising:
 a first contact point potential acquisition means that acquires a contact point potential between the electric motor and the switching element when the switching element is switched from on to off and the contact point potential changes in conjunction with a termination of the supply of the electric power to the electric motor;
 a second contact point potential acquisition means that acquires the contact point potential while the electric power is being supplied to the electric motor when the switching element has been switched on;
 a first determination means that determines, based on the contact point potential that has been acquired by the first contact point potential acquisition means, whether a mode of change in the contact point potential that is associated with the termination of the supply of the electric power to the electric motor is a mode when the electric motor and the switching element are normal or a mode when one of the electric motor and the switching element has failed;
 a second determination means that determines whether the contact point potential that has been acquired by the second contact point potential acquisition means is equal to or larger than a predetermined first threshold potential; and
 a failure diagnosis means that determines that the electric motor and the switching element are normal if it is determined by the first determination means that the mode of the change in the contact point potential is the mode when the electric motor and the switching element are normal, determines that the electric motor has failed if it is determined by the first determination means that the mode of the change in the contact point potential is the mode when one of the electric motor and the switching element has failed and if it is also determined by the second determination means that the contact point potential is equal to or larger than the predetermined first threshold potential, and determines that the switching element has failed if it is determined by the first determination means that the mode of the change in the contact point potential is the mode when one of the electric motor and the switching element has failed and if it is also determined by the second determination means that the contact point potential is less than the predetermined first threshold potential.

2. The motor drive device according to claim 1, wherein the second contact point potential acquisition means acquires the contact point potential after a duration of an inrush current has elapsed after supplying of the electric power to the electric motor is performed.

3. The motor drive device according to claim 2, comprising:
   a first electric power supply control means that performs supplying of electric power to the electric motor by turning the switching element on for a first predetermined time interval; and
   a second electric power supply control means that performs supplying of electric power to the electric motor by turning the switching element on for a second predetermined time interval that is longer than a duration of an inrush current that is generated when the switching element is switched on,
   wherein
   the first contact point potential acquisition means acquires the contact point potential that changes in conjunction with the termination of the supply of the electric power to the electric motor by the first electric power supply control means,
   the second contact point potential acquisition means acquires the contact point potential after the duration of the inrush current has elapsed after the supplying of the electric power to the electric motor is started by the second electric power supply control means, and
   supplying of the electric power by the first electric power supply control means and acquiring of the contact point potential by the first contact point potential acquisition means are performed before supplying of the electric power by the second electric power supply control means and acquiring of the contact point potential by the second contact point potential acquisition means are performed.

4. The motor drive device according to claim 1, comprising:
   a first electric power supply control means that performs supplying of electric power to the electric motor by turning the switching element on for a first predetermined time interval; and
   a second electric power supply control means that performs supplying of electric power to the electric motor by turning the switching element on for a second predetermined time interval that is longer than a duration of an inrush current that is generated when the switching element is switched on,
   wherein
   the first contact point potential acquisition means acquires the contact point potential that changes in conjunction with the termination of the supply of the electric power to the electric motor by the first electric power supply control means,
   the second contact point potential acquisition means acquires the contact point potential after the duration of the inrush current has elapsed after the supplying of the electric power to the electric motor is started by the second electric power supply control means, and
   supplying of the electric power by the first electric power supply control means and acquiring of the contact point potential by the first contact point potential acquisition means are performed before supplying of the electric power by the second electric power supply control means and acquiring of the contact point potential by the second contact point potential acquisition means are performed.

5. The motor drive device according to claim 4, wherein the supplying of the electric power by the second electric power supply control means and the acquiring of the contact point potential by the second contact point potential acquisition means are performed only when it has been determined by the first determination means that the mode of the change in the contact point potential is the mode when one of the electric motor and the switching element has failed, and are not performed when it has been determined by the first determination means that the mode of the change in the contact point potential is the mode when the electric motor and the switching element are normal.

6. The motor drive device according to claim 5, wherein
   the supplying of the electric power by the first electric power supply control means and the acquiring of the contact point potential by the first contact point potential acquisition means are performed a plurality of times before the supplying of the electric power by the second electric power supply control means and the acquiring of the contact point potential by the second contact point potential acquisition means are performed.

7. The motor drive device according to claim 6, wherein
   in the plurality of times of the supplying of the electric power by the first electric power supply control means and the acquiring of the contact point potential by the first contact point potential acquisition means, the first predetermined time interval at one of the plurality of times is made shorter as the one of the plurality of times occurs earlier, and
   the supplying of the electric power is performed again by the first electric power supply control means only when it has been determined by the first determination means, based on the contact point potential that was previously acquired by the first contact point potential acquisition means, that the mode of the change in the contact point potential is the mode when one of the electric motor and the switching element has failed, and the supplying of the electric power is not performed again when it has been determined, based on the previously acquired contact point potential, that the mode of the change in the contact point potential is the mode when the electric motor and the switching element are normal.

8. The motor drive device according to claim 4, wherein the supplying of the electric power by the first electric power supply control means and the acquiring of the contact point potential by the first contact point potential acquisition means are performed a plurality of times before the supplying of the electric power by the second electric power supply control means and the acquiring of the contact point potential by the second contact point potential acquisition means are performed.

9. The motor drive device according to claim 8, wherein in the plurality of times of the supplying of the electric power by the first electric power supply control means and the acquiring of the contact point potential by the first contact point potential acquisition means, the first predetermined time interval at one of the plurality of times is made shorter as the one of the plurality of times occurs earlier, and
   the supplying of the electric power is performed again by the first electric power supply control means only when it has been determined by the first determination means, based on the contact point potential that was previously acquired by the first contact point potential acquisition means, that the mode of the change in the contact point potential is the mode when one of the electric motor and the switching element has failed, and the supplying of the electric power is not performed again when it has been determined, based on the previously acquired contact point potential, that the mode of the change in the contact point potential is the mode when the electric motor and the switching element are normal.

10. The motor drive device according to claim 1, wherein the first determination means:
determines whether the contact point potential that has been acquired by the first contact point potential acquisition means is equal to or smaller than a predetermined second threshold potential;
defines, as a measurement time interval, a time interval from a time point when supplying of the electric power to the electric motor is terminated to a time point when it is determined that the contact point potential is equal to or smaller than the second threshold potential; and
determining, in a case where the measurement time interval is equal to or larger than a predetermined threshold time interval, that the mode of the change in the contact point potential is the mode when the electric motor and the switching element are normal, and determining, in a case where the measurement time interval is less than the threshold time interval, that the mode of the change in the contact point potential is the mode when one of the electric motor and the switching element has failed.

11. The motor drive device according to claim 10, wherein the electric motor drives an electric pump that increases brake fluid pressure in a brake system of a vehicle, and the motor drive device comprises:
a brake operation amount detection means that detects an amount of operation of a brake operating member for operating the brake system; and
a brake operation amount versus threshold time interval setting means that makes the threshold time interval shorter as the operation amount that has been detected by the brake operation amount detection means becomes greater.

12. The motor drive device according to claim 11, comprising:
a power supply voltage detection means that detects a voltage of the direct current power supply; and
a power supply voltage versus threshold time interval setting means that makes the threshold time interval shorter as the direct current power supply voltage that has been detected by the power supply voltage detection means becomes smaller.

13. The motor drive device according to claim 10, comprising:
a power supply voltage detection means that detects a voltage of the direct current power supply; and
a power supply voltage versus threshold time interval setting means that makes the threshold time interval shorter as the direct current power supply voltage that has been detected by the power supply voltage detection means becomes smaller.

14. The motor drive device according to claim 1, wherein the first contact point potential acquisition means acquires the contact point potential at a time point when a predetermined set time interval has elapsed since a time point when supply of the electric power to the electric motor is terminated, and
the first determination means determines that the mode of the change in the contact point potential is the mode when the electric motor and the switching element are normal in a case where the contact point potential that has been acquired by the first contact point potential acquisition means is equal to or larger than a predetermined set potential, and determines that the mode of the change in the contact point potential is the mode when one of the electric motor and the switching element has failed in a case where the contact point potential that has been acquired by the first contact point potential acquisition means is less than the predetermined set potential.

15. The motor drive device according to claim 14, wherein the electric motor drives an electric pump that increases brake fluid pressure in a brake system of a vehicle, and the motor drive device comprises:
a brake operation amount detection means that detects an amount of operation of a brake operating member for operating the brake system; and
a brake operation amount versus potential setting means that makes the set potential smaller as the operation amount that has been detected by the brake operation amount detection means becomes greater.

16. The motor drive device according to claim 15, comprising:
a power supply voltage detection means that detects a voltage of the direct current power supply; and
a power supply voltage versus potential setting means that makes the set potential smaller as the direct current power supply voltage that has been detected by the power supply voltage detection means becomes smaller.

17. The motor drive device according to claim 14, comprising:
a power supply voltage detection means that detects a voltage of the direct current power supply; and
a power supply voltage versus potential setting means that makes the set potential smaller as the direct current power supply voltage that has been detected by the power supply voltage detection means becomes smaller.

18. The motor drive device according to claim 1, comprising:
a power supply voltage detection means that detects a voltage of the direct current power supply; and
a first threshold potential setting means that makes the first threshold potential smaller as the direct current power supply voltage that has been detected by the power supply voltage detection means becomes smaller.

* * * * *